United States Patent
Lee

(10) Patent No.: US 8,013,476 B2
(45) Date of Patent: Sep. 6, 2011

(54) AUTO POWER CONTROLLER OF EXTERNAL EQUIPMENT ON VALID CHECK

(75) Inventor: Jae-hak Lee, Seoul (KR)

(73) Assignee: NEXG Co., Ltd., Seoul (KR)

( * ) Notice: Subject to any disclaimer, the term of this patent is extended or adjusted under 35 U.S.C. 154(b) by 37 days.

(21) Appl. No.: 12/304,753

(22) PCT Filed: Aug. 16, 2006

(86) PCT No.: PCT/KR2006/003198
§ 371 (c)(1),
(2), (4) Date: Dec. 12, 2008

(87) PCT Pub. No.: WO2008/001973
PCT Pub. Date: Jan. 3, 2008

(65) Prior Publication Data
US 2009/0195072 A1  Aug. 6, 2009

(30) Foreign Application Priority Data
Jun. 30, 2006  (KR) .................. 10-2006-0061076

(51) Int. Cl.
*H01H 9/54* (2006.01)

(52) U.S. Cl. ...................................... 307/140
(58) Field of Classification Search .................. 307/140
See application file for complete search history.

(56) References Cited

U.S. PATENT DOCUMENTS
2007/0140238 A1* 6/2007 Ewing et al. .................. 370/389
2007/0255460 A1* 11/2007 Lopata .......................... 700/293

FOREIGN PATENT DOCUMENTS
KR  10-2004-0079182  9/2004
KR  20-0413145  3/2006

OTHER PUBLICATIONS
WIPO, International Search Report for International Application No. PCT/KR2006/003198.
Korean Office Action, mailing date Aug. 24, 2007, for corresponding Korean Application No. 10-2006-0061076.

* cited by examiner

*Primary Examiner* — Robert L. Deberadinia
(74) *Attorney, Agent, or Firm* — Intellectual Property Law Group LLP; Juneko Jackson

(57) ABSTRACT

The present invention relates to a power controller for at least one piece of external equipment, the power controller being connected to the external equipment. The power controller includes a main unit (203) for transmitting an external equipment status checking request signal, required to detect an abnormality of the external equipment, to the external equipment at preset regular intervals or at a preset time point, determining that an abnormality has occurred in the external equipment when an abnormality is present in an external equipment status checking signal received from the external equipment in response to the external equipment status checking request signal, or when no external equipment status checking signal is received, and consequently transmitting a power reset request signal to an expansion unit (201). The expansion unit (201) resets power of the external equipment in response to the received power reset request signal.

8 Claims, 8 Drawing Sheets

[Fig. 1]
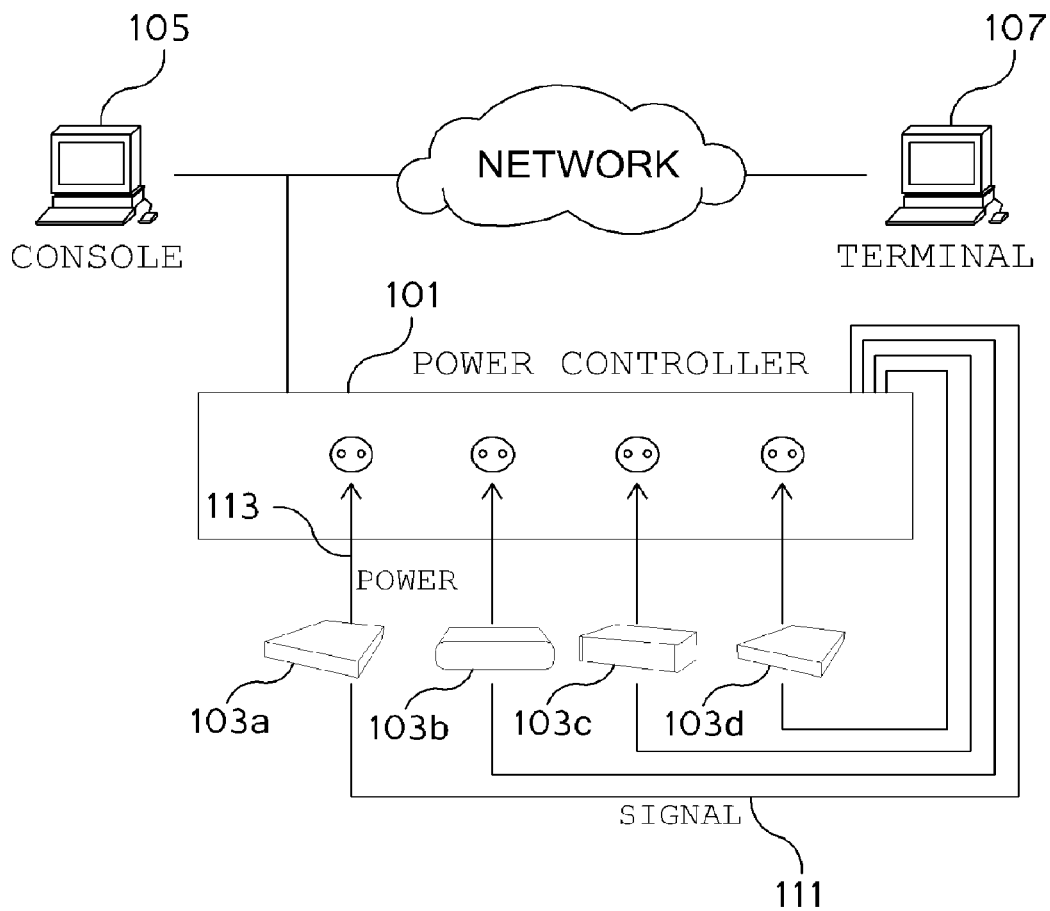
[Fig. 2]
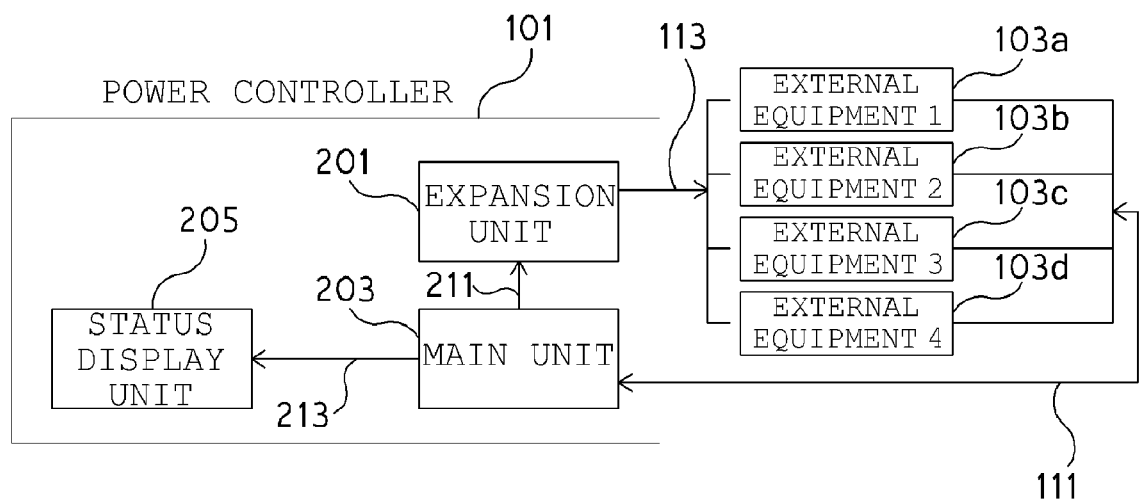

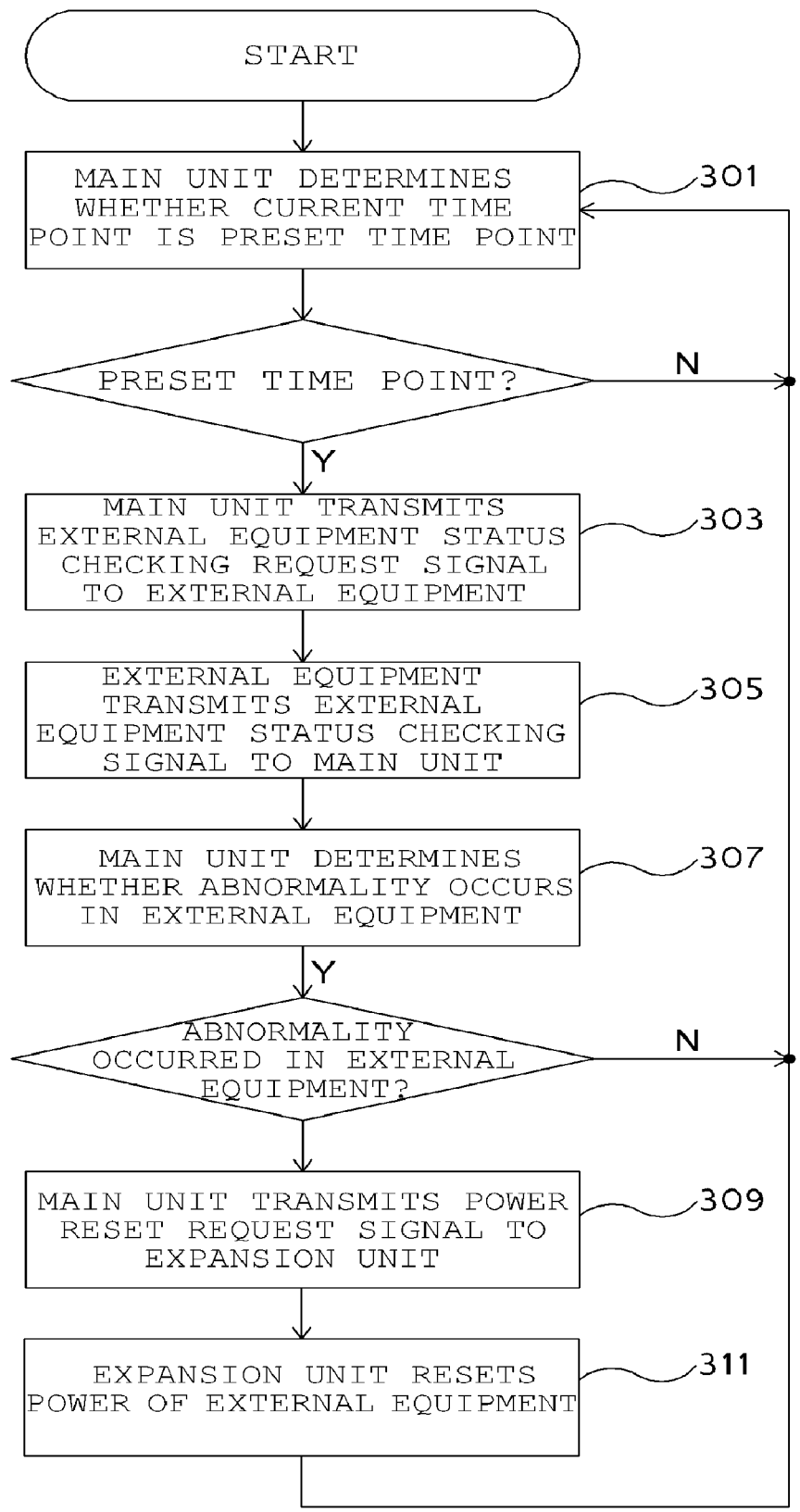
[Fig. 3]

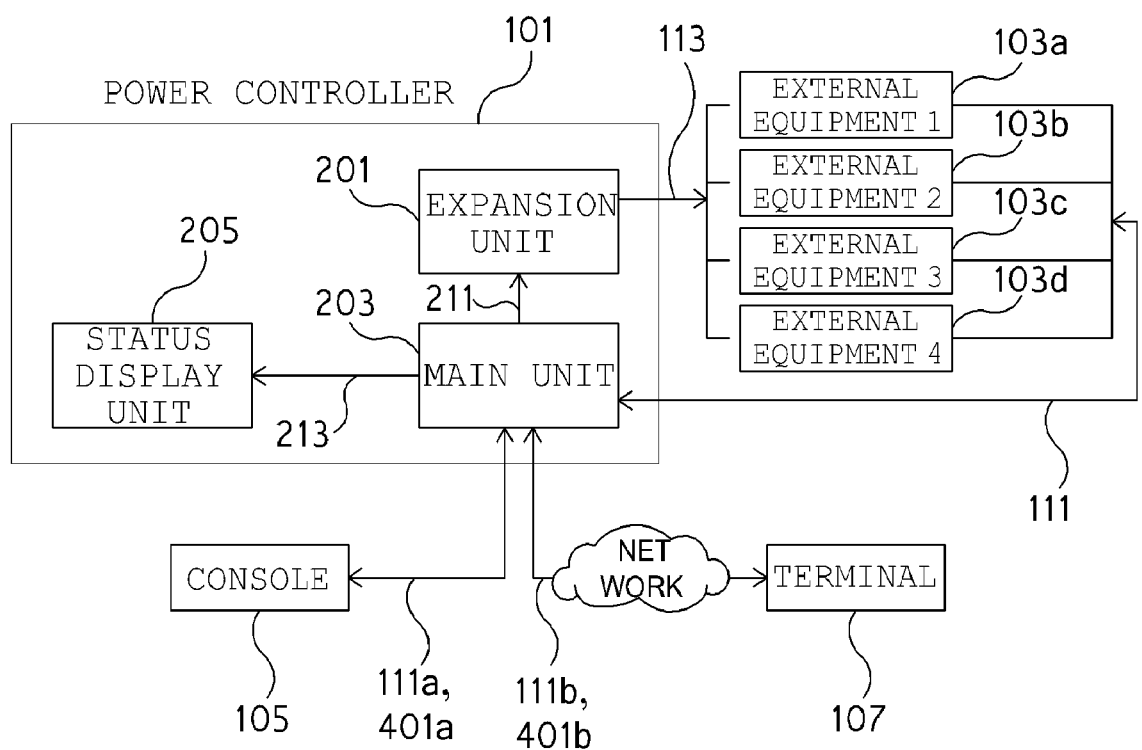
[Fig. 4]

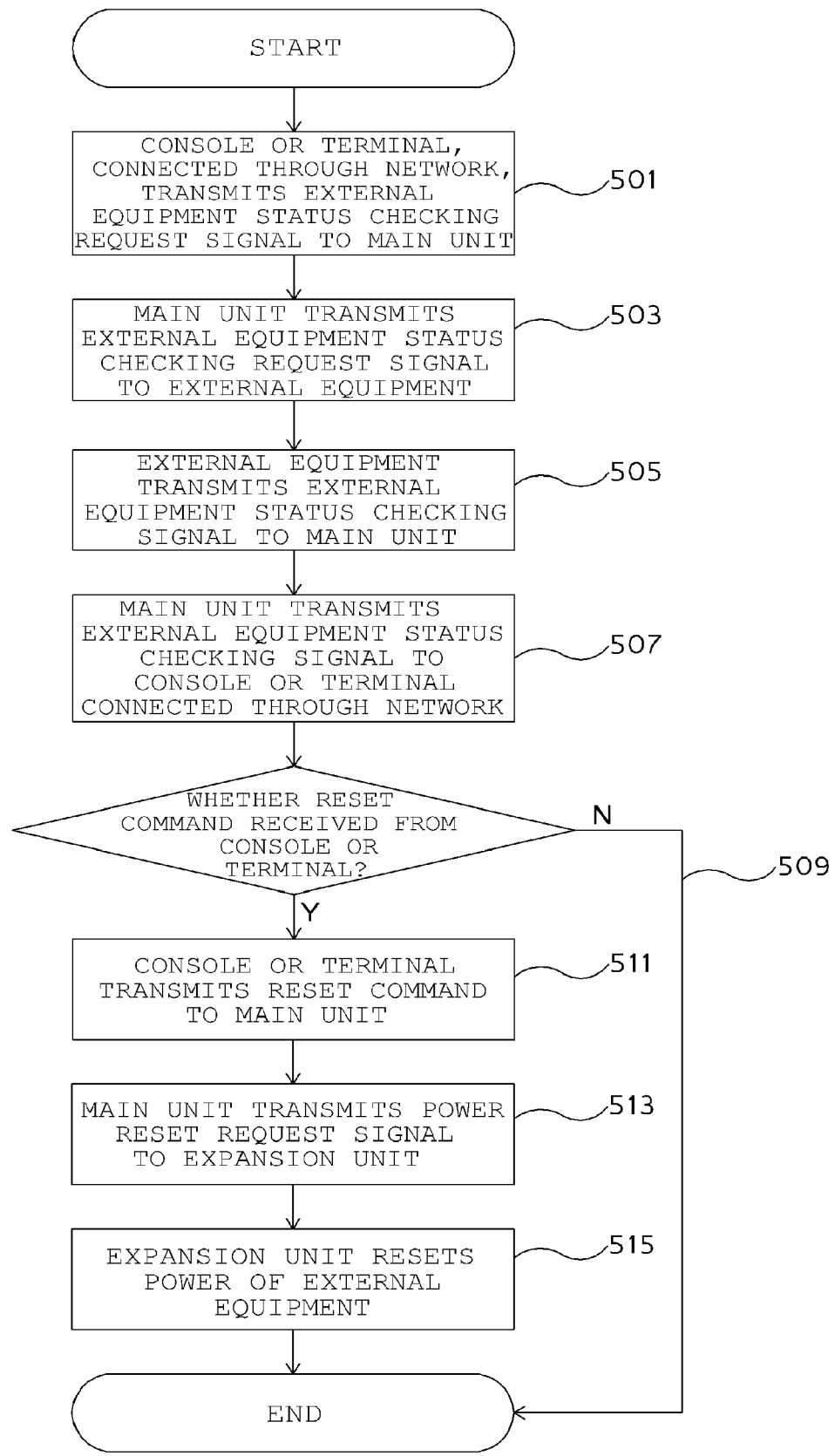
[Fig. 5]

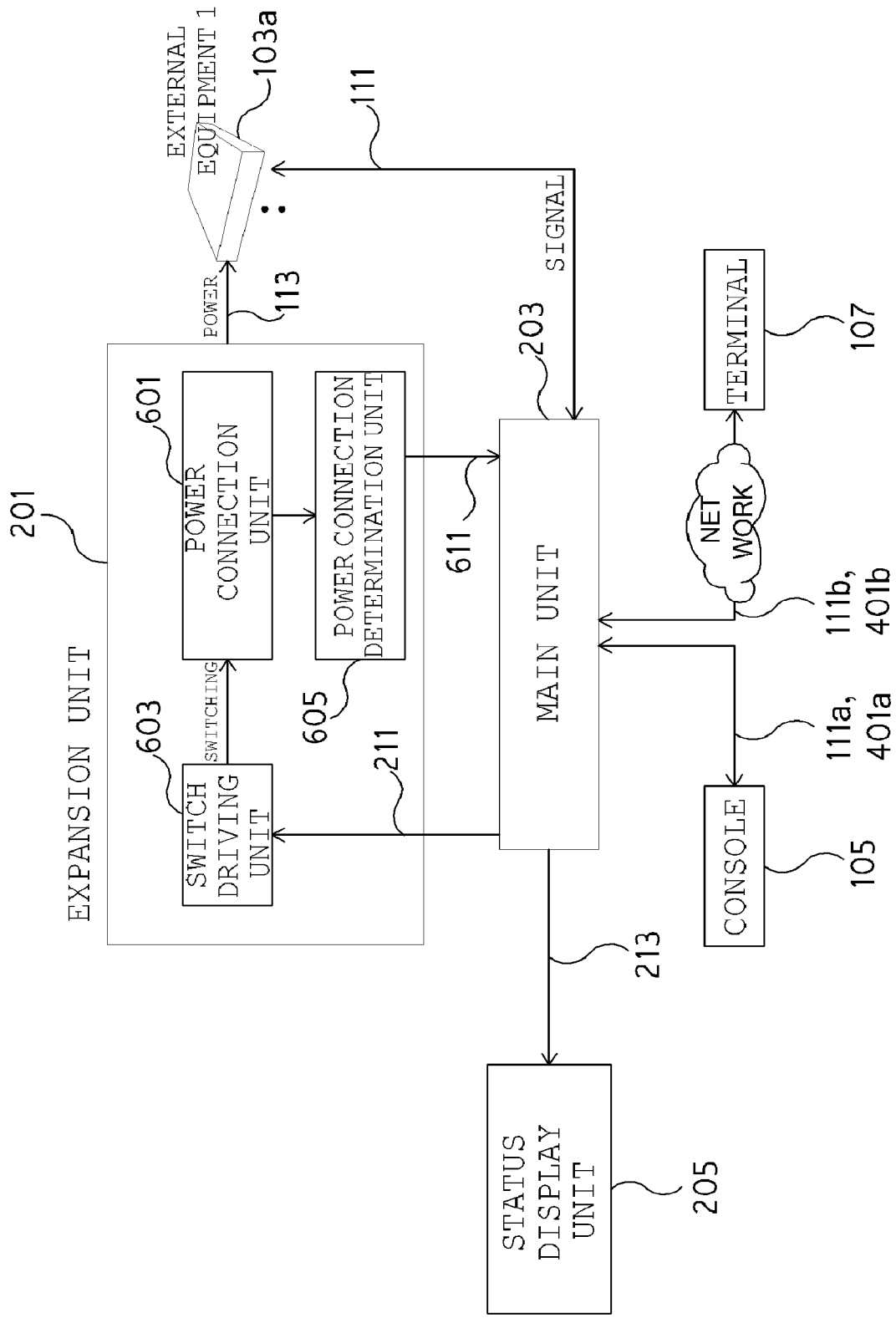
[Fig. 6]

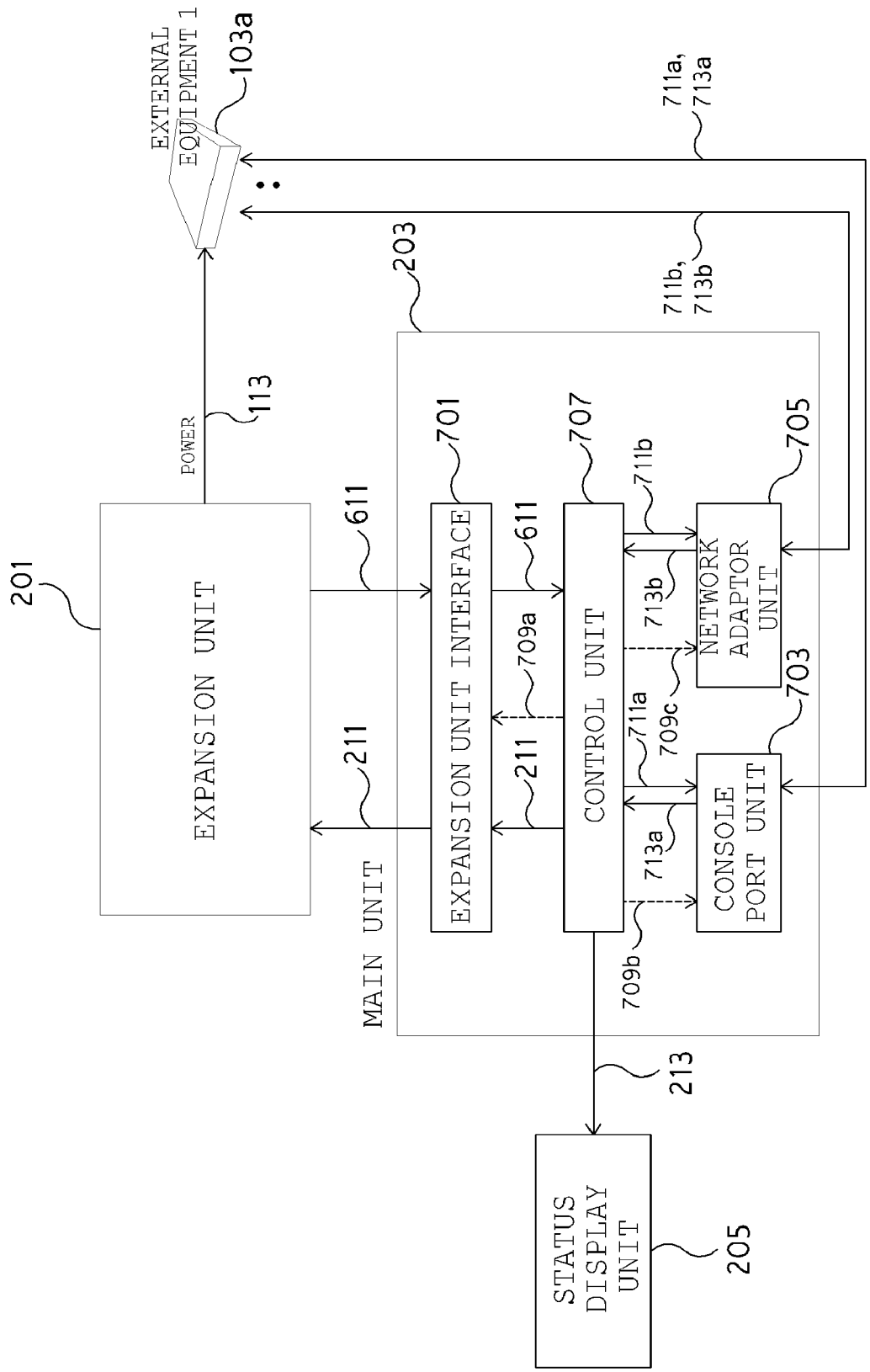
[Fig. 7]

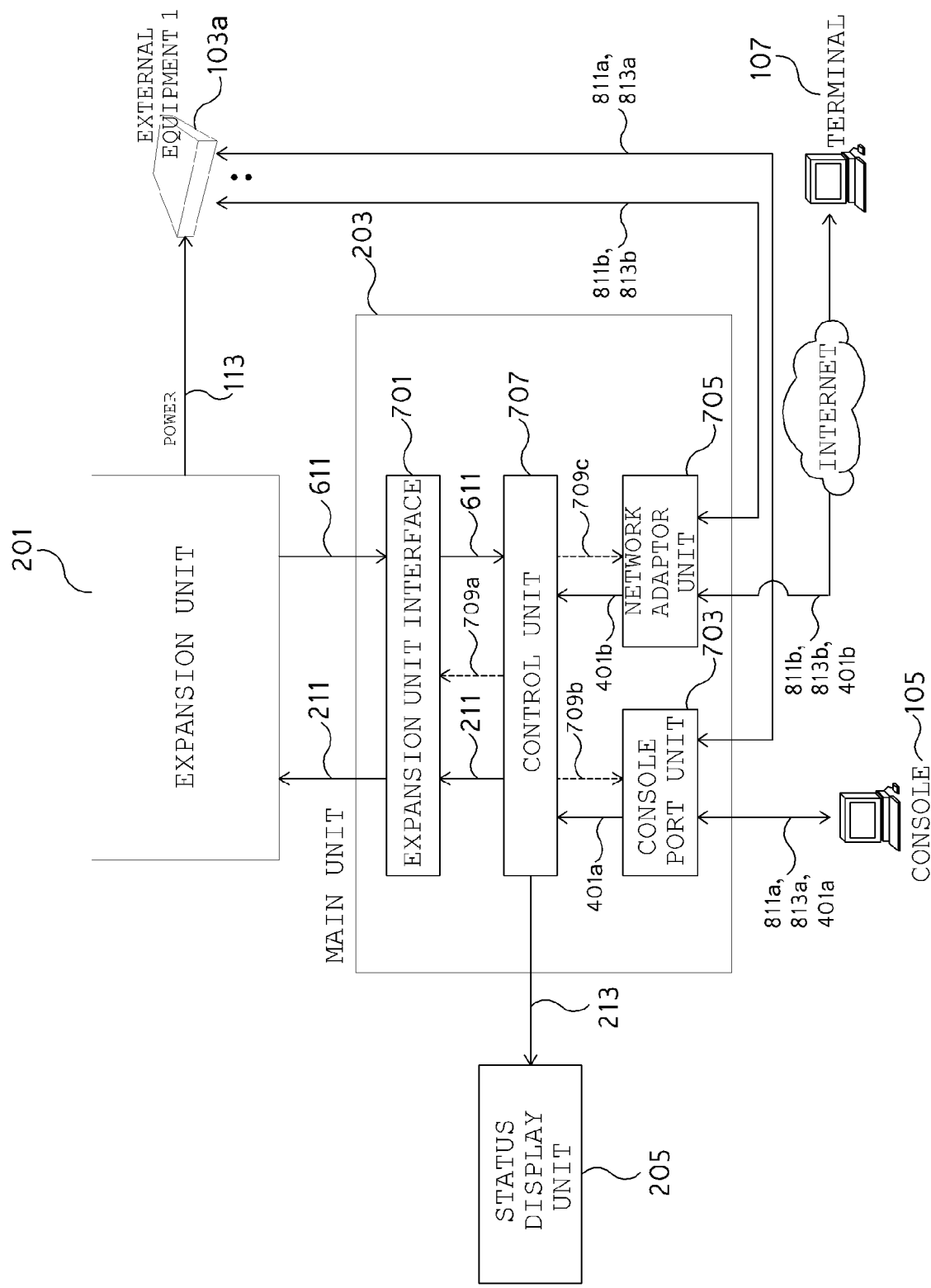
[Fig. 8]

[Fig. 9]
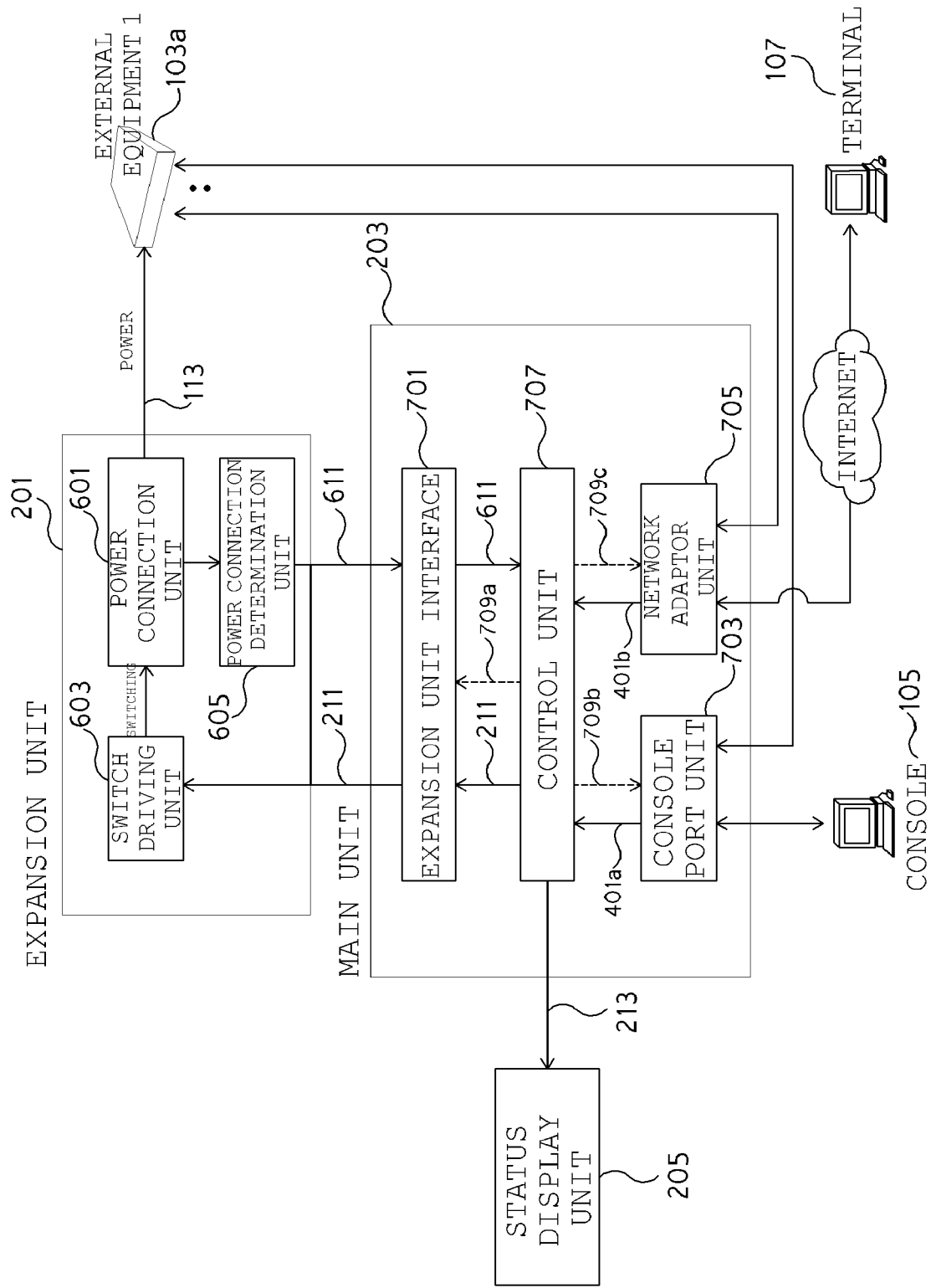

AUTO POWER CONTROLLER OF EXTERNAL EQUIPMENT ON VALID CHECK

TECHNICAL FIELD

The present invention relates, in general, to a power controller for controlling power through the detection of the abnormalities of external equipment and, more particularly, to an automatic power controller, which can automatically reset external equipment connected to the power controller when an abnormality occurs in the external equipment, and to a manual power controller, which can reset the external equipment through a console or a terminal connected through a network.

BACKGROUND ART

Generally, methods of most simply and efficiently initializing a system upon abnormal operation thereof may include a method of resetting the system by interrupting the supply of power to the system.

Conventional power control devices include various power control devices ranging from a power cutoff device, which is capable of directly cutting off power using a switch, to a remote power control device, which is capable of controlling the operation of a switch from a remote place.

However, the conventional power cutoff device, which is capable of directly cutting off power using a switch, and the conventional remote power control device are disadvantageous in that, since the power control device itself cannot detect the abnormalities of equipment, a manager cannot easily detect the abnormalities of equipment, thus it is difficult to promptly repair the equipment. In particular, when power control is remotely performed from a remote place, there is a problem in that a power control device cannot be connected to network equipment, which is a target for power control, because of an abnormality occurring in network equipment, thus power control cannot be performed.

DISCLOSURE OF INVENTION

Technical Problem

Accordingly, the present invention has been made keeping in mind the above problems occurring in the prior art, and an object of the present invention is to provide an automatic power controller, which can detect the abnormality of external equipment connected to the power controller, and can reset the power of the external equipment when an abnormality occurs in the external equipment.

Another object of the present invention is to provide a manual power controller, which allows a console, connected to the power controller, or a terminal connected thereto through a network to detect the abnormality of external network equipment through the power controller, and which can reset the external network equipment when an abnormality occurs in the external network equipment.

A further object of the present invention is to provide a scheme for linking a serial console to external equipment in the case where the serial console is connected to the power controller.

Technical Solution

In accordance with an aspect of the present invention to accomplish the above objects, there is provided a power controller for at least one piece of external equipment, the power controller being connected to the external equipment, comprising a main unit for transmitting an external equipment status checking request signal, required to detect an abnormality of the external equipment, to the external equipment at preset regular intervals or at a preset time point, determining that an abnormality has occurred in the external equipment when an abnormality is present in an external equipment status checking signal received from the external equipment in response to the external equipment status checking request signal, or when no external equipment status checking signal is received, and consequently transmitting a power reset request signal to an expansion unit, and the expansion unit for resetting power of the external equipment in response to the received power reset request signal.

According to an embodiment of the present invention, the main unit may be connected to the external equipment through a serial port, and the external equipment status checking request signal and the external equipment status checking signal may correspond to transmitted and received signals, respectively, when a method of checking status of the external equipment is a method of comparing output results relative to a designated input with each other and determining the status of the external equipment. Further, the main unit may be connected to the external equipment through a Local Area Network (LAN), and the external equipment status checking request signal and the external equipment status checking signal may correspond to transmitted and received signals, respectively, when a method of checking status of the external equipment is a method using any one selected from among Address Resolution Protocol (ARP) Packet Internet Grouper (PING), Internet Control Message Protocol (ICMP) PING, User Datagram Protocol (UDP) echo, Transmission Control Protocol (TCP) connection, UDP communication, and TCP communication. Further, the power controller may comprise a status display unit for displaying operating status of the power controller, power connection status of the external equipment, and status of connection of the external equipment to a serial port. Further, the expansion unit may determine whether power is supplied to the external equipment, and thus transmit a power connection determination signal to the main unit, and the main unit may control display of power connection status of each piece of external equipment on the status display unit on the basis of the received power connection determination signal. Further, the expansion unit may comprise at least one power connection unit for supplying power to the external equipment, a switch driving unit for switching supply of power from the power connection unit to the external equipment under control of the main unit, and a power connection determination unit for determining whether the power connection unit supplies power to the external equipment, and consequently transmitting a power connection determination signal to the main unit. Further, the main unit may comprise a console port unit for providing connection between the control unit and the external equipment through a serial port, a network adaptor unit for providing connection between the control unit and the external equipment through a Local Area Network (LAN), an expansion unit interface for providing an interface for transmission and reception of the power connection determination signal and the power reset request signal between the control unit and the expansion unit, and a control unit for controlling operation of the console port unit, the network adaptor unit, and the expansion unit interface, transmitting the external equipment status checking request signal to the external equipment through the console port unit or the network adaptor unit at preset regular intervals or at a preset time point, determining that an abnormality has occurred in the external equipment when an abnormality is present in the external equipment status checking signal, received from the external equipment through the console port unit or the network adaptor unit in response to the external equipment status checking request signal, or when no external equipment status checking signal is received, transmitting a power reset request signal to the expansion unit through the expansion unit interface, and controlling display operation of the status display unit.

In accordance with another aspect of the present invention to accomplish the above objects, there is provided a power controller for at least one piece of external equipment, the power controller being connected to the external equipment and to a serial console or a terminal through a network, comprising a main unit for receiving an external equipment status checking request signal, required to detect an abnormality of the external equipment, from the serial console or the terminal connected through the network, transmitting the external equipment status checking request signal to the external equipment, transmitting an external equipment status checking signal to the serial console or the terminal connected through the network when the external equipment status checking signal is received from the external equipment in response to the external equipment status checking request signal, and controlling supply of power from an expansion unit to the external equipment, and the expansion unit for supplying power to the external equipment under control of the main unit, wherein the main unit transmits a power reset request signal to the expansion unit when a reset command is received from the serial console or the terminal connected through the network, and the expansion unit resets power of the external equipment in response to the power reset request signal.

According to an embodiment of the present invention, the main unit may be connected to the external equipment through a serial port, and the external equipment status checking request signal and the external equipment status checking signal may correspond to transmitted and received signals, respectively, when a method of checking status of the external equipment is a method of comparing output results relative to a designated input with each other and determining the status of the external equipment. Further, the main unit may be connected to the external equipment through a Local Area Network (LAN), and the external equipment status checking request signal and the external equipment status checking signal may correspond to transmitted and received signals, respectively, when a method of checking status of the external equipment is a method using any one selected from Address Resolution Protocol (ARP) Packet Internet Grouper (PING), Internet Control Message Protocol (ICMP) PING, User Datagram Protocol (UDP) echo, Transmission Control Protocol (TCP) connection, UDP communication, and TCP communication. Further, the power controller may further comprise a status display unit for displaying operating status of the power controller, power connection status of the external equipment, and status of connection of the external equipment to a serial port. Further, the expansion unit may determine whether power is supplied to the external equipment, and thus transmit a power connection determination signal to the main unit, and the main unit may control display of power connection status of each piece of external equipment on the status display unit on the basis of the received power connection determination signal. Further, the expansion unit may comprise at least one power connection unit for supplying power to the external equipment, a switch driving unit for switching supply of power from the power connection unit to the external equipment under control of the main unit, and a power connection determination unit for determining whether the power connection unit supplies power to the external equipment, and thus transmitting a power connection determination signal to the main unit. Further, the main unit may comprise a console port unit for providing an interface for connection of a serial console to the power controller, and linking the serial console, connected to the power controller, with the external equipment, a network adaptor unit for providing an interface for connection of a remote terminal to the power controller through a network, an expansion unit interface for providing an interface for transmission and reception of the power connection determination signal and the power reset request signal between the control unit and the expansion unit, and a control unit for controlling operation of the console port unit, the network adaptor unit, and the expansion unit interface, transmitting a power reset request signal to the expansion unit through the expansion unit interface when a reset command is received from the serial console or the remote terminal through the console port unit or the network adaptor unit, and controlling a display operation of the status display unit, wherein the console port unit or the network adaptor unit transmits the external equipment status checking request signal, received from the serial console or the remote terminal, to the external equipment, and transmits the external equipment status checking signal to the serial console or the terminal, connected through the network, when the external equipment status checking signal is received from the external equipment in response to the external equipment status checking request signal.

Advantageous Effects

According to the present invention, the present invention can provide an automatic power controller, which can automatically detect the abnormality of external equipment connected to the power controller, and can reset the external equipment when an abnormality occurs in the external equipment.

Further, according to the present invention, the present invention can provide a remote power controller, which allows a console, connected to the power controller, and a terminal, connected through a network, to detect the abnormality of external equipment through the power controller, and can remotely reset the external equipment from a remote place when an abnormality occurs in the external equipment.

BRIEF DESCRIPTION OF THE DRAWINGS

FIG. 1 is a diagram showing the overall connection of a power controller according to an embodiment of the present invention;

FIG. 2 is a block diagram of an automatic power controller according to an embodiment of the present invention;

FIG. 3 is a flowchart showing the operating sequence of an automatic power controller according to an embodiment of the present invention;

FIG. 4 is a block diagram of a manual power controller according to an embodiment of the present invention;

FIG. 5 is a flowchart showing the operating sequence of a manual power controller according to an embodiment of the present invention;

FIG. 6 is a block diagram showing the internal construction of the expansion unit of the automatic and manual power controllers according to an embodiment of the present invention;

FIG. 7 is a block diagram showing the internal construction of the main unit of the automatic power controller according to an embodiment of the present invention;

FIG. 8 is a block diagram showing the internal construction of the main unit of the remote power controller according to an embodiment of the present invention; and FIG. 9 is a block diagram showing an integrated power controller according to an embodiment of the present invention.

BEST MODE FOR CARRYING OUT THE INVENTION

Hereinafter, embodiments of the present invention will be described in detail with reference to the attached drawings.

FIG. 1 is a diagram showing the overall connection of a power controller according to an embodiment of the present invention. In this case, a power controller 101 according to the present invention may function as an automatic power controller for determining the operating status of external equipment 103a to 103d by itself, and for resetting the power of the external equipment 103a to 103d, and a manual power controller for resetting the power of the external equipment 103a to 103d under the control of a manager, accessing a serial console 105 and a terminal 107, connected through a network. That is, the power controller 101 according to the present invention can be designated as both an automatic and manual power controller.

Referring to FIG. 1, the power controller 101 according to the present invention is coupled to the external equipment 103a to 103d. The external equipment 103a to 103d includes various types of equipment connected thereto through a network, such as a hub, a router, a modem, and Virtual Private Network (VPN) equipment. Further, the power controller may be coupled both to the serial console 105 and to the terminal 107, connected thereto through the network, in order to function as the manual power controller.

In this case, the external equipment 103a to 103d is supplied with power 113 from the power controller 101, and exchanges signals 111, required to detect the abnormalities of the external equipment 103a to 103d, with the power controller 101. The signals 111 required to detect the abnormalities of the external equipment 103a to 103d include an external equipment status checking request signal and an external equipment status checking signal, which will be described in detail later with reference to FIGS. 2 and 3.

Further, when the power controller 101 according to the present invention functions as an automatic power controller, the power controller 101 detects the abnormalities of the external equipment 103a to 103d on the basis of the presence and information of the external equipment status checking signal received from the external equipment 103a to 103d, thus controlling the supply of power to the external equipment. That is, when no external equipment status checking signal is received, or when an abnormality is present in the signal although the signal has been received, the power controller 101 determines that an abnormality has occurred in the external equipment 103a to 103d, and thus resets the power 113 of the external equipment. In this case, the term reset means an operation of cutting off the supply of power and supplying power again. Hereinafter, the term reset is understood to have this meaning.

Meanwhile, when the power controller 101 according to the present invention functions as a manual power controller, the power controller is coupled to the serial console 105, or the terminal 107, connected through the network, in order to make a connection to the power controller. Further, the console 105 or the terminal 107 exchanges the signals 111, required to detect the abnormalities of the external equipment 103a to 103d, with the external equipment 103a to 103d through the power controller 101. When it is determined that an abnormality has occurred in the operation of the external equipment 103a to 103d, on the basis of the signals 111, required to detect the abnormalities of the external equipment, and a reset command is received from the console 105 or the terminal 107, the power controller 101 can reset the power 113 of the external equipment in response to the reset command.

FIG. 2 is a block diagram of an automatic power controller according to an embodiment of the present invention.

Referring to FIG. 2, an automatic power controller 101 according to the present invention includes an expansion unit 201 and a main unit 203.

The expansion unit 201 supplies power 113 to the external equipment 103a to 103d under the control of the main unit 203.

The main unit 203 transmits an external equipment status checking request signal, required to detect the abnormalities of the external equipment 103a to 103d, to the external equipment 103a to 103d at preset regular intervals or at a preset time point, and receives an external equipment status checking signal from the external equipment 103a to 103d when there is an external equipment status checking signal corresponding to the external equipment status checking request signal. The main unit 203 determines whether the external equipment 103a to 103d is normally operating on the basis of the presence and information of the received external equipment status checking signal, and controls the supply of power from the expansion unit 201 to the external equipment 103a to 103d.

In this case, when no external equipment status checking signal is received from the external equipment 103a to 103d, or when an abnormality is present in the received external equipment status checking signal, the main unit 203 determines that an abnormality has occurred in the external equipment 103a to 103d, and transmits a power reset request signal 211 to the expansion unit 201. The expansion unit 201 resets the power 113 of the external equipment 103a to 103d in response to the power reset request signal 211.

The external equipment status checking request signal and the external equipment status checking signal correspond to transmitted and received signals, respectively, when a method of checking the status of the external equipment is implemented using any one of service checking methods using Address Resolution Protocol (ARP) Packet Internet Grouper (PING), Internet Control Message Protocol (ICMP) PING, User Datagram Protocol (UDP) echo, Transmission Control Protocol (TCP) connection, UDP communication, and TCP communication, which are methods performed through a network, and a method of comparing output results relative to a designated input with each other and determining the status of the external equipment, which is a method performed through a serial port. For example, the ICMP PING is a method of transmitting a messaged called an ICMP echo request from a tester side to a remote host, and determining whether the remote host is normally operating depending on whether the remote host responds to the ICMP echo request message. In the present invention, the ICMP echo request message transmitted by the power controller 101 to the external equipment 103a to 103d is the external equipment status checking request signal, and a response signal to the ICMP echo request message is the external equipment status checking signal.

The automatic power controller 101 according to the present invention may further include a status display unit 205 for displaying the operating status of the power controller 101 and the power connection status of the external equipment 103a to 103d under the control of the main unit 203. In this case, the main unit 203 transmits a status display control signal 213, required to display the operating status on the status display unit 205, to the status display unit 205.

FIG. 3 is a flowchart showing the operating sequence of the automatic power controller according to an embodiment of the present invention.

Referring to FIG. 3, since the automatic power controller 101 according to the present invention checks the abnormalities of the external equipment at preset regular time intervals or at a preset time point, the main unit 203 determines whether the current time point is a time point designated by the preset time intervals, or the preset time point at step 301. If the current time point is not a designated or preset time point, the main unit waits for the designated or preset time point, whereas, if the current time point reaches the designated or preset time point, the main unit enters the step of checking the abnormalities of the external equipment.

First, the main unit 203 transmits an external equipment status checking request signal to the external equipment 103a to 103d at step 303. In this case, the external equipment status checking request signal is required to detect the abnormalities of the external equipment, and corresponds to a signal transmitted by a tester side when abnormality detection is performed using any one of service checking methods using ARP PING, ICMP PING, UDP echo, TCP connection, UDP communication, and TCP communication, which are methods performed through a network, and the method of comparing output results relative to a designated input with each other and determining the status, which is a method performed through a serial port, as described with reference to FIG. 2.

The external equipment 103a to 103d, having received the external equipment status checking request signal, transmits an external equipment status checking signal to the main unit 203 at step 305. In this case, the external equipment status checking signal corresponds to the signal received by the tester side when abnormality detection is performed using any one of service checking methods using ARP PING, ICMP PING, UDP echo, TCP connection, UDP communication, and TCP communication, which are methods performed through a network, and the method of comparing output results relative to a designated input with each other and determining the status, which is a method performed through a serial port, as described with reference to FIG. 2. Of course, when an abnormality occurs in the external equipment, the external equipment status checking request signal cannot be occasionally transmitted.

The main unit 203, having received such an external equipment status checking signal, determines whether an abnormality has occurred in the external equipment 103a to 103d on the basis of the external equipment status checking signal at step 307. In this case, the main unit 203 determines that an abnormality has occurred in the external equipment 103a to 103d when no external equipment status checking signal is received from the external equipment 103a to 103d, or when an abnormality is present in the received external equipment status checking signal.

If it is determined that no abnormality occurs in the external equipment as a result of the determination, the main unit 203 performs no operation, so that the power of the external equipment 103a to 103d is maintained. However, when the time point preset by the main unit 203 is reached at step 301, all of the steps starting from step 303 are repeated.

Meanwhile, if it is determined that an abnormality has occurred in the external equipment 103a to 103d as a result of the determination, the main unit 203 transmits a power reset request signal 211 to the expansion unit 201 at step 309. The expansion unit 201, having received the power reset request signal 211, resets the power of the external equipment 103a to 103d at step 311.

FIG. 4 is a block diagram of a manual power controller according to an embodiment of the present invention.

Referring to FIG. 4, a remote power controller 101 according to the present invention includes an expansion unit 201 and a main unit 203. The main unit 203 is connected to a serial console 105 or to a terminal 107 connected through a network.

The expansion unit 201 supplies power 113 to external equipment 103a to 103d under the control of the main unit 203.

The main unit 203 transmits an external equipment status checking request signal, received from the serial console 105, connected to the power controller 101, or the terminal 107, connected to the power controller 101 through the network, to the external equipment 103a to 103d, receives an external equipment status checking signal corresponding to the external equipment status checking request signal from the external equipment 103a to 103d, transmits the received external equipment status checking signal to the serial console 105 or the terminal 107, and controls the supply of power from the expansion unit 201 to the external equipment 103a to 103d.

In this case, the external equipment status checking request signal and the external equipment status checking signal correspond to transmitted and received signals, respectively, when the method of checking the status of the external equipment is implemented using any one of service checking methods using Address Resolution Protocol (ARP) Packet Internet Grouper (PING), Internet Control Message Protocol (ICMP) PING, User Datagram Protocol (UDP) echo, Transmission Control Protocol (TCP) connection, UDP communication, and TCP communication, which are methods performed through a network, and a method of comparing output results relative to a designated input with each other and determining the status of the external equipment, which is a method performed through a serial port. When no external equipment status checking signal is received, or when an abnormality is present in the received external equipment status checking signal, the serial console 105 or the terminal 107 can determine that an abnormality has occurred in the external equipment 103a to 103d, and can provide a reset command 401.

In this case, when the reset command 401 is received from the serial console 105 or the terminal 107, having received the external equipment status checking signal, the main unit 203 transmits a power reset request signal 211 to the expansion unit 201. The expansion unit 201, having received the power reset request signal 211, resets the power 113 of the external equipment 103a to 103d.

The automatic power controller 101 according to the present invention may further include a status display unit 205 for displaying the operating status of the power controller 101, the power connection status of the external equipment 103a to 103d, and the status of the connection of the external equipment 103a to 103d to the serial console under the control of the main unit 203. In this case, the main unit 203 transmits a status display control signal 213, required to display the operating status on the status display unit 205, to the status display unit 205.

FIG. 5 is a flowchart showing the operating sequence of the manual power controller according to an embodiment of the present invention.

Referring to FIG. 5, the serial console 105 or the terminal 107, connected through the network, transmits an external equipment status checking request signal to the main unit 203 at step 501. The main unit 203, having received the external equipment status checking request signal, transmits the external equipment status checking request signal to the external equipment 103a to 103d at step 503. In this case, the external equipment status checking request signal is required to detect the abnormalities of the external equipment, and corresponds to a signal transmitted by a tester side when abnormality detection is performed using any one of service checking methods using ARP PING, ICMP PING, UDP echo, TCP connection, UDP communication, and TCP communication, which are methods performed through a network, and the method of comparing output results relative to a designated input with each other and determining the status, which is a method performed through a serial port, as described with reference to FIG. 2.

The external equipment 103a to 103d, having received the external equipment status checking request signal, transmits an external equipment status checking signal to the main unit 203 at step 505. The main unit 203 transmits the received external equipment status checking signal to the serial console 105, or to the terminal 107 connected through the network, at step 507. In this case, the external equipment status checking signal corresponds to a signal received by the tester side when abnormality detection is performed using any one of service checking methods using ARP PING, ICMP PING, UDP echo, TCP connection, UDP communication, and TCP communication, which are methods performed through a network, and the method of comparing output results relative to a designated input with each other and determining the status, which is a method performed through a serial port, as described with reference to FIG. 2.

When no external equipment status checking signal is received, or when an abnormality is present in a received external equipment status checking signal, the serial console 105 or the terminal 107 can determine that an abnormality has occurred in the external equipment 103a to 103d, and can provide a reset command 401 at step 511. However, when no abnormality is present in the external equipment status checking signal, all steps are terminated without providing the reset command 401 at step 509.

When an abnormality is present in the external equipment status checking signal, and the main unit 203 receives the reset command 401, the main unit 203 transmits a power reset request signal 211 to the expansion unit 201 at step 513, and the expansion unit 201, having received the power reset request signal 211, resets the power 113 of the external equipment 103a to 103d at step 515.

FIG. 6 is a block diagram showing the internal construction of the expansion unit of the automatic and manual power controllers according to an embodiment of the present invention.

Referring to FIG. 6, an expansion unit 201 includes a power connection unit 601, a switch driving unit 603, and a power connection determination unit 605.

The power connection unit 601 supplies power 113 to the external equipment 103a to 103d. A power controller 101 according to the present invention can supply power to at least one piece of external equipment 103a to 103d, thus the power connection unit 601 can be implemented as a plurality of power connection units.

The switch driving unit 603 resets the supply of power from the power connection unit 601 to the external equipment 103a to 103d by driving a switch in response to a power reset request signal 211 from the main unit 203.

The power connection determination unit 605 determines whether the power connection unit 601 supplies power to the external equipment 103a to 103d, and thus transmits a power connection determination signal 611 to the main unit 203. In this case, the main unit 203 transmits a status display control signal 213, required to control the display of the power connection status of each piece of external equipment 103a to 103d on the status display unit 205, to the status display unit 205 on the basis of the received power connection determination signal 611, and then the status display unit 205 can display the power connection status thereof.

FIG. 7 is a block diagram showing the internal construction of the main unit of the automatic power controller according to an embodiment of the present invention.

Referring to FIG. 7, a main unit 203 includes an expansion unit interface 701, a console port unit 703, a network adaptor unit 705, and a control unit 707.

The expansion unit interface 701 provides an interface for the transmission and reception of a power connection determination signal 611 and a power reset request signal 211 between the control unit 707 and the expansion unit 201. That is, the expansion unit interface 701 transmits the power connection determination signal 611, received from the expansion unit 201, to the control unit 707, and transmits the power reset request signal 211, received from the control unit 707, to the expansion unit 201.

The console port unit 703 provides a connection between the control unit 707 and the external equipment 103a to 103d through a serial port. The network adaptor unit 705 provides a connection between the control unit 707 and the external equipment 103a to 103d through a network.

The control unit 707 controls the operation of the expansion unit interface 701, the console port unit 703, and the network adaptor unit 705 (709a, 709b, 709c), detects the abnormalities of the external equipment 103a to 103d, and controls the supply of power from the expansion unit 201 to the external equipment 103a to 103d. That is, at regular intervals, which are automatically preset for detection of abnormalities in the external equipment, or at a preset time point, the control unit 707 transmits an external equipment status checking request signal 711a or 711b to the external equipment 103a to 103d through the console port unit 703 or the network adaptor unit 705. When an abnormality is present in an external equipment status checking signal 713a or 713b, which has been received from the external equipment 103a to 103d through the console port unit 703 or the network adaptor unit 705 in response to the external equipment status checking request signal 711a or 711b, or when no external equipment status checking signal 713 is received, the control unit 707 determines that an abnormality has occurred in the external equipment 103a to 103d, and thus transmits the power reset request signal 211 to the expansion unit 201 through the expansion unit interface 701. Further, when the automatic power controller 101 of the present invention includes the status display unit 205, the control unit 707 transmits a status display control signal 213, required to display operating status on the status display unit 205, to the status display unit 205.

FIG. 8 is a block diagram showing the main unit of the manual power controller according to an embodiment of the present invention.

Referring to FIG. 8, a main unit 203 includes an expansion unit interface 701, a console port unit 703, a network adaptor unit 705, and a control unit 707.

The expansion unit interface 701 provides an interface for the transmission and reception of a power connection determination signal 611 and a power reset request signal 211 between the control unit 707 and the expansion unit 201. That is, the expansion unit interface 701 transmits the power connection determination signal 611, received from the expansion unit 201, to the control unit 707, and transmits the power reset request signal 211, received from the control unit 707, to the expansion unit 201.

The console port unit 703 provides an interface for the connection of a serial console to the power controller 101, especially for the connection to the control unit 707. Further, the console port unit 703 links the serial console 105, connected to the power controller 101, with the external equipment 103a to 103d. That is, the console port unit 703 relays an external equipment status checking request signal 811a and an external equipment status checking signal 813a between the serial console 105, connected to the power controller 101, and the external equipment 103a to 103d.

The network adaptor unit 705 provides an interface for the connection of a remote terminal to the power controller 101 through the network, especially for the connection to the control unit 707. That is, the network adaptor unit 705 provides an interface for the transmission and reception of an external equipment status checking request signal 811b and an external equipment status checking signal 813b between the remote terminal 107, connected to the power controller 101, and the external equipment 103a to 103d.

The control unit 707 controls the operation of the expansion unit interface 701, the console port unit 703, and the network adaptor unit 705 (709a, 709b, 709c). Further, when a reset command 401 is received from the serial console 105 or the remote terminal 107 through the console port unit 703 or the network adaptor unit 705, the control unit 707 transmits the power reset request signal 211 to the expansion unit 201 through the expansion unit interface 701. Further, when the manual power controller 101 of the present invention includes the status display unit 205, the control unit 707 transmits the status display control signal 213, required to display operating status on the status display unit 205, to the status display unit 205.

FIG. 9 is a block diagram showing an integrated power controller according to an embodiment of the present invention.

FIG. 9 illustrates the construction of the expansion unit and the main unit of the power controller in detail. The construction of the expansion unit is the same as that of the above description in connection with FIG. 6, and the construction of the main unit is the same as that of the above description in connection with FIGS. 7 and 8, and thus a detailed description thereof is omitted.

The invention claimed is:

1. A power controller for at least one piece of external equipment, the power controller being connected to the external equipment, comprising:
   a main unit for determining if an abnormality has occurred in the external equipment at preset regular intervals or at a preset time point and for controlling supply of power to the external equipment; and
   an expansion unit for resetting power of the external equipment when determined by the main unit as being in an abnormal status;
   wherein the main unit comprises:
      a console port unit for providing connection to the external equipment through a serial port;
      a network adaptor unit for providing connection to the external equipment through a Local Area Network (LAN);
      an expansion unit interface for providing an interface to transmit signals to and receive signals from the expansion unit; and
      a control unit for controlling operation of the console port unit, the network adaptor unit, and the expansion unit interface, and for controlling supply of power to the external equipment;
   wherein the expansion unit comprises:
      at least one power connection unit for supplying power to the external equipment;
      a switch driving unit for switching supply of power from the power connection unit to the external equipment under control of the control unit of the main unit; and
      a power connection determination unit for determining whether the power connection unit supplies power to the external equipment, and consequently for transmitting a power connection determination signal to the main unit; and
   wherein the control unit of the main unit
      transmits an external equipment status checking request signal to the external equipment through the console port unit or the network adaptor unit at preset regular intervals or at a preset time point;
      determines that an abnormality has occurred in the external equipment when an abnormality is present in an external equipment status checking signal received from the external equipment through the console port unit or the network adaptor unit in response to the external equipment status checking request signal or when no external equipment status checking signal is received; and
      transmits a power reset request signal to the expansion unit through the expansion unit interface, and the switch driving unit of the expansion unit resets power of the external equipment in response to the power reset request signal.

2. The power controller according to claim 1, wherein:
the main unit is connected to the external equipment through the console port unit and a serial port, and
the external equipment status checking request signal and the external equipment status checking signal correspond to transmitted and received signals, respectively, wherein a method of checking a status of the external equipment is a method of comparing output results relative to a designated input with each other and determining the status of the external equipment.

3. The power controller according to claim 1, wherein:
the main unit is connected to the external equipment through the network adaptor unit and a Local Area Network (LAN), and
the external equipment status checking request signal and the external equipment status checking signal correspond to transmitted and received signals, respectively, wherein a method of checking a status of the external equipment is a method using any one selected from the group consisting of Address Resolution Protocol (ARP) Packet Internet Grouper (PING), Internet Control Message Protocol (ICMP) PING, User Datagram Protocol (UDP) echo, Transmission Control Protocol (TCP) connection, UDP communication, and TCP communication.

4. The power controller according to claim 1, further comprising a status display unit for displaying an operating status of the power controller, a power connection status of the external equipment, and a status of connection of the external equipment to a serial port.

5. A power controller for at least one piece of external equipment, the power controller being connected to the external equipment and to a serial console or a terminal through a network, comprising:
- a main unit for determining if an abnormality has occurred in the external equipment and for controlling supply of power to the external equipment;
- an expansion unit for resetting power of the external equipment determined by the main unit as being in an abnormal status;

wherein the main unit comprises:
- a console port unit providing an interface for connection with the serial console, linking the serial console with the external equipment and providing connection to the external equipment through a serial port;
- a network adaptor unit providing an interface for connection with the terminal through a network and providing connection to the external, equipment through a Local Area Network (LAN);
- an expansion unit interface providing an interface for transmitting signals to and receiving signals from the expansion unit; and
- a control unit for controlling operation of the console port unit, the network adaptor unit, and the expansion unit interface, and for controlling supply of power to the external equipment;

wherein the expansion unit comprises:
- at least one power connection unit for supplying power to the external equipment;
- a switch driving unit for switching supply of power from the power connection unit to the external equipment under control of the control unit of the main unit; and
- a power connection determination unit for determining whether the power connection unit supplies power to the external equipment, and consequently for transmitting a power connection determination signal to the main unit; and wherein the control unit of the main unit
- transmits an external equipment status checking request signal received from the serial console or the terminal to the external equipment;
- transmits the external equipment status checking signal received from the external equipment in response to the external equipment status checking request signal to the serial console or the terminal; and
- transmits a power reset request signal to the expansion unit through the expansion unit interface when a reset command is received from the serial console or the terminal, and the switch driving unit of the expansion unit resets power of the external equipment in response to the power reset request signal.

6. The power controller according to claim 5, wherein:
the main unit is connected to the external equipment through the console port unit and a serial port, and
the external equipment status checking request signal and the external equipment status checking signal correspond to transmitted and received signals, respectively, wherein a method of checking a status of the external equipment is a method of comparing output results relative to a designated input with each other and determining the status of the external equipment.

7. The power controller according to claim 5, wherein:
the main unit is connected to the external equipment through the network adaptor unit and a Local Area Network (LAN), and
the external equipment status checking request signal and the external equipment status checking signal correspond to transmitted and received signals, respectively, wherein a method of checking a status of the external equipment is a method using any one selected from the group consisting of Address Resolution Protocol (ARP) Packet Internet Grouper (PING), Internet Control Message Protocol (ICMP) PING, User Datagram Protocol (UDP) echo, Transmission Control Protocol (TCP) connection, UDP communication, and TCP communication.

8. The power controller according to claim 5, further comprising a status display unit for displaying an operating status of the power controller, a power connection status of the external equipment, and a status of connection of the external equipment to a serial port.

* * * * *